United States Patent [19]

Magerl

[11] Patent Number: 4,566,099
[45] Date of Patent: Jan. 21, 1986

[54] SYNCHRONOUS CLOCK GENERATOR FOR DIGITAL SIGNAL MULTIPLEX DEVICES

[75] Inventor: Johann Magerl, Munich, Fed. Rep. of Germany

[73] Assignee: Siemens Aktiengesellschaft, Berlin & Munich, Fed. Rep. of Germany

[21] Appl. No.: 510,329

[22] Filed: Jul. 1, 1983

[30] Foreign Application Priority Data

Jul. 13, 1982 [DE] Fed. Rep. of Germany ....... 3226201

[51] Int. Cl.⁴ .............................................. H04J 3/06
[52] U.S. Cl. ........................................ 370/100; 370/84
[58] Field of Search ................. 370/100, 102, 112, 84; 375/106; 377/37, 43, 44, 56

[56] References Cited

U.S. PATENT DOCUMENTS

| | | | |
|---|---|---|---|
| 3,789,195 | 1/1974 | Meier et al. | 377/37 |
| 4,076,964 | 2/1978 | Henrion et al. | 370/100 |
| 4,121,055 | 10/1978 | Doherty | 370/112 |
| 4,340,962 | 7/1982 | Wintzer et al. | 370/100 |

Primary Examiner—Douglas W. Olms
Assistant Examiner—Kenneth I. Rokoff
Attorney, Agent, or Firm—Hill, VAn Santen, Steadman & Simpson

[57] ABSTRACT

An exemplary embodiment includes a first binary counter whose counting period corresponds to a block length of a pulse frame, a block counter controlled by the first counter, and a logic element for generating working clock signals, wherein the counters are switchable for employment in different multiplex systems and the logic element gates out the working clock signals for different multiplex systems.

9 Claims, 4 Drawing Figures

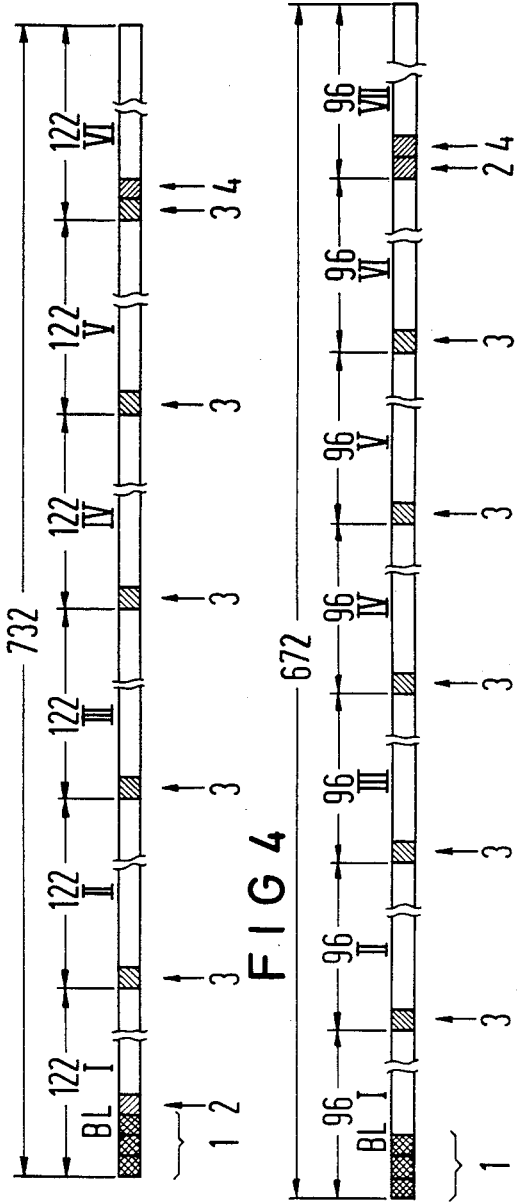

SYNCHRONOUS CLOCK GENERATOR FOR DIGITAL SIGNAL MULTIPLEX DEVICES

BACKGROUND OF THE INVENTION

The invention relates to a synchronous clock generator for digital signal multiplex devices comprising a first counter whose counting period corresponds to a block length of a pulse frame and which can be set into a prescribed counter reading, comprising a block counter controlled by said first counter and comprising a logic element connected to the outputs of the counters for generating working clock signals.

In digital signal multiplexers, a plurality of digital message streams are combined into a multiplex signal. As is known, digital information such as, for example, the frame identification word, the stuffing identifier bits as well as the stuffing and signalling bits must be inserted into the multiplex signal. Clock pulses produced in clock generators serve to mark these points in time. At the receive side, the multiplex signal must in turn be divided into a plurality of message streams and the auxiliary information must be evaluated at the correct time. The clock generators of a specific multiplexer stage required at the transmit and receive sides differ only slightly from one another. In contrast thereto, different multiplexers for different hierarchy stages exhibit different pulse frames which contain a different number of bits. The pulse frames in various hierarchy stages can differ both in the number of the transmitted blocks as well as in the number of the transmitted bits per block or in both. A separate clock generator has hitherto been developed for each multiplexer.

SUMMARY OF THE INVENTION

The object of the invention is to specify a clock generator employable in various multiplexers.

Proceeding from the prior art initially described, this object is resolved in that change-over devices are provided for changing the counting period of the first counter and/or of the block counter in accord with the employment in different multiplexers and in that the logic element gates out the working clock signals for different multiplexer stages.

It is expedient to develop only a single switchable clock generator which can be employed in at least two different hierarchy stages or multiplexer devices. To this end, the counting period of at least one counter is changed. Expediently, one clock generator is designed for similar pulse frame structures. The logic element for generating working clock intervals must thereby indeed generate working clock signals for both hierarchy stages but these are frequently produced at the same counter readings of the clock generator. A considerable saving in terms of development costs derives in that only a single clock generator need be developed, although the clock generator is slightly more complicated.

It is advantageous that a first switchable gate is provided as the change-over means for changing over the counting period of the first binary counter, the inputs of said switchable gate being connected to the outputs of the first counter and its output being conducted to the setting input of the first counter.

Given different counting periods, the first counter is always switched back into the same initial position. The logic element for generating the working clocks is thereby simplified since this is principally required at the beginning of each block of a pulse frame. Given reception of a frame recognition word, the clock generator, on the other hand, must be set into a different counter reading. This occurs with the assistance of the control logic element. It can be expedient due to the time conditions of the clocks employed to thereby set the first counter into a counter reading which, depending upon the transit time of the circuit, corresponds to one of the next bits after the reception of the frame recognition word.

It is expedient that a second switchable gate is provided as the change-over means for the counting period of the block counter, the inputs of said second switchable gate being connected to the outputs of the block counter and its output being linked to the input of the control logic circuit over a second OR element whose output is connected to the setting input of the block counter.

It is expedient to execute the change-over means for the block counter in the same manner as in the case of the first counter. The block counter requires no control logic element since the received frame recognition word switches it into the same counter reading as given standard resetting after conclusion of the counting period.

It is expedient that a first gate is provided with two outputs, its first output being conducted to the setting input of the first counter and its second output being connected to the carry input of the block counter.

Thereby achieved is that the block counter is clocked at a different point in time than the first counter. The outputs of the block counter thereby become chronologically uncritical for gating out the first bit of each block.

Advantageous further developments of the invention are recited in the remaining subclaims.

An exemplary embodiment of the invention is explained in greater detail with reference to fundamental circuit diagrams and time diagrams; and other objects, features and advantages will be apparent from this detailed disclosure and from the appended claims.

BRIEF DESCRIPTION OF THE DRAWINGS

FIG. 3 shows a pulse frame for the multiplexer system 34/140; and

FIG. 4 shows a multiplex frame for the multiplex system 140/565.

DETAILED DESCRIPTION

Figure 1:
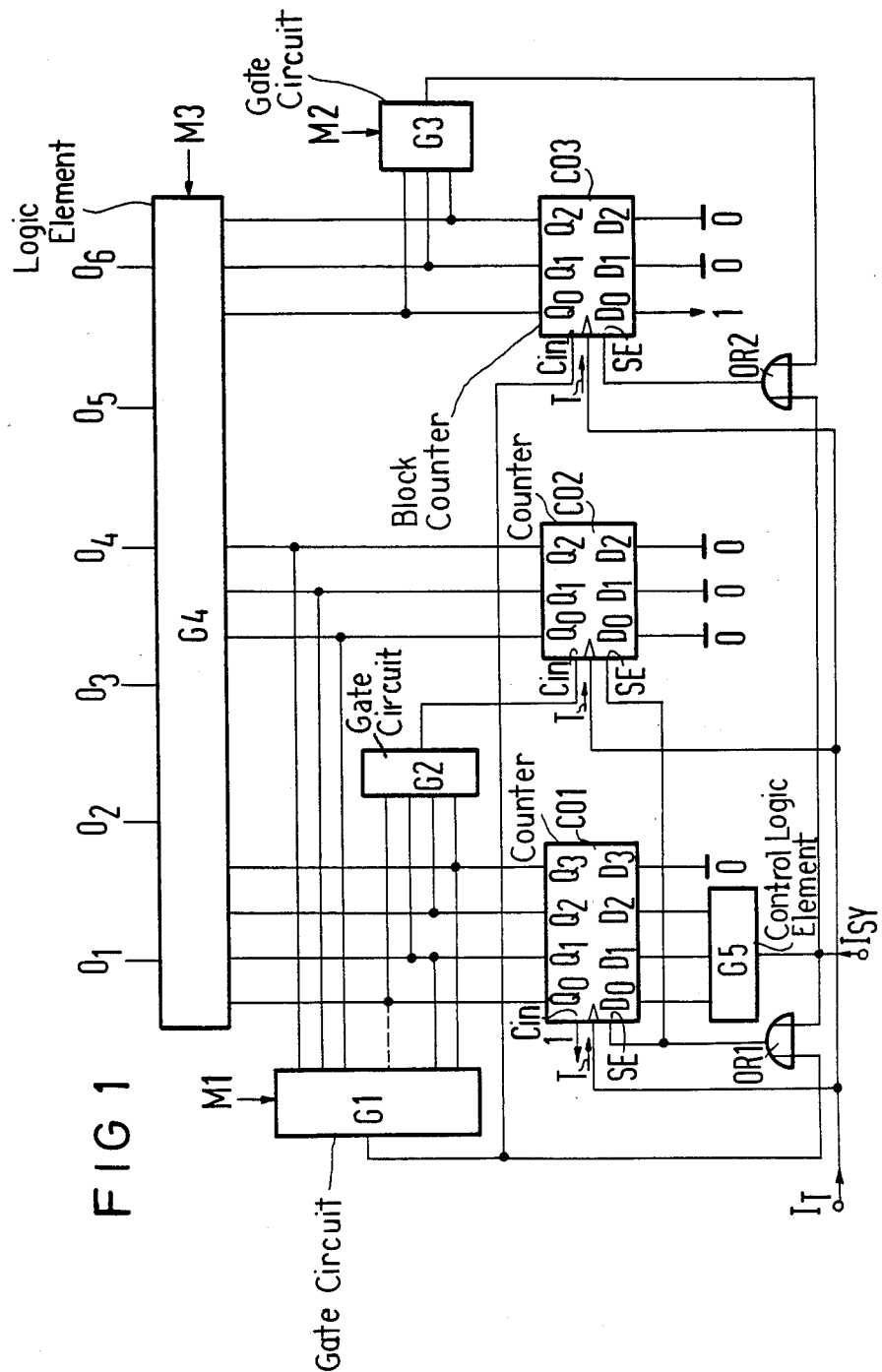
FIG. 1 is a fundamental circuit diagram of the clock generator.

The clock generator illustrated in FIG. 1 contains three binary counter CO1, CO2 and CO3. The working clock rate T is supplied to each binary counter over a clock input $I_T$. The outputs of the individual trigger circuits of the counters CO1 through CO3 are connected to a logic element G4 for generating working clock signals which are emitted to the outputs $O_1$ through $O_6$ of the logic element G4. Whereas, the carry input $C_{in}$ of the first binary counter CO1 lies at logical one (1), the carry input $C_{in}$ of the second binary counter CO2 is connected to the output of a second gate circuit G2 whose inputs are connected to the outputs $Q_0$ through $Q_3$ of the first binary counter CO1. The carry input is here assumed to be activated when a logical one signal is applied thereto. In many counter modules, a logical zero is required at the carry input for activation instead of a logical one. This, of course, is to be taken into consideration when realizing the circuit. A first switchable gate G1 is likewise connected to the outputs of the first binary counter and to the outputs $Q_0$ through $Q_2$ of the second binary counter. Dependent on the bit combination to be gated out, it is not absolutely necessary to provide connections to all terminals. This is indicated by means of a connection indicated with broken lines and by means of an omitted connection between the inputs of the first switchable gate G1 and the output $Q_2$ of the first binary counter. The output of the first switchable gate G1 is connected via a first OR element OR1 to the setting inputs SE of the first and of the second binary counters CO1, CO2. Moreover, the output of the first switchable gate is also connected to the carry input $C_{in}$ of the block counter CO3. The outputs $Q_0$ through $Q_2$ of the block counter are conducted back to the setting input SE of the block counter CO3 via a second switchable gate G3 and via a second OR gate OR2. The first three data inputs $D_0$ through $D_2$ of the first binary counter CO1 are preceded by a control logic element G5. A synchronizing pulse is supplied to its input $I_{SY}$ from a synchronizing means not illustrated here. The input $I_{SY}$ of the control logic element G5 is also respectively connected to the second input of the first and of the second OR element OR1 and OR2. The remaining data inputs of the counters, with the exception of the first data input $D_0$ of the block counter, lie at the logical zero (0) The switchable gates G1, G3 are provided with change-over inputs M1, M2, respectively. A further change-over input M3 performs operations on the logic element G4. The logic element G4 essentially contains gate circuits with whose assistance specific counter readings (count values) of the counters are gated out. The output working clock signals are generally conducted via trigger circuits in order to rid them of noise pulses.

Figure 2:
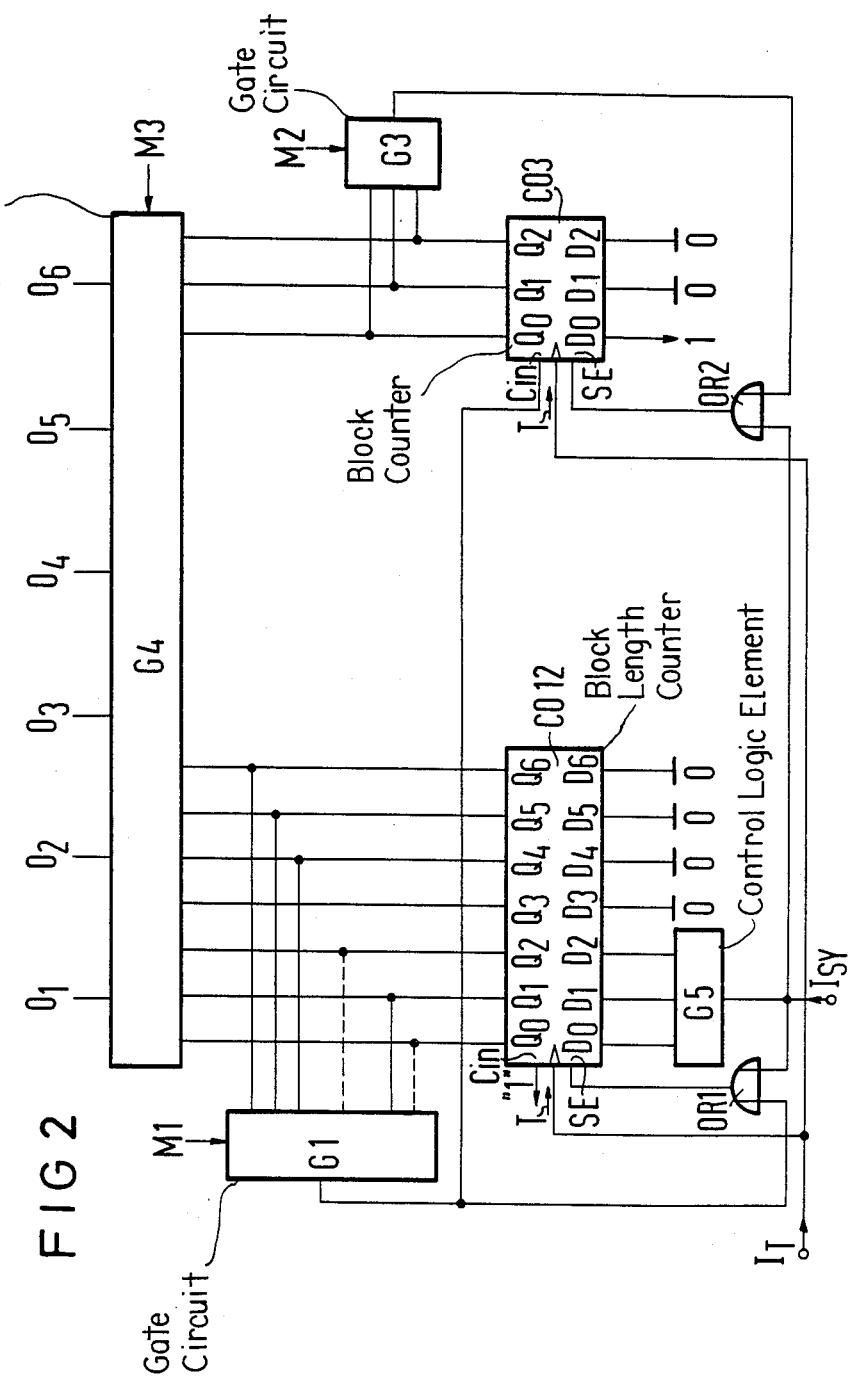
FIG. 2 shows an exemplary embodiment of the clock generators.

An exemplary embodiment of the clock generator is illustrated in FIG. 2. This essentially corresponds with the clock generator illustrated in FIG. 1; the two binary counters CO1 and CO2 are replaced by a first binary counter CO12. The reset event of the employed counters ensues synchronously with the working clock rate.

The clock generator illustrated in FIG. 2 should, for example, be switchable for the multiplex devices 34/140 and 140/565. The pulse frames of these multiplexer stages are illustrated in FIG. 3 and in FIG. 4. It is thereby respectively a matter of the frame related to a data stream of the low bit rate. Respectively four of said data streams are combined into a multiplex signal. At the receive side, the received multiplex signal is divided into four data streams which correspond to the illustrated pulse frame. The data stream emitted at the receive side is again continous. The pulse frame illustrated in FIG. 3 comprises 732 bits. These are subdivided into six blocks I through VI having respectively 122 bits. The participating frame recognition word (3 bits) is identified with reference numeral 1; 2 identifies a bit of the signalling word; the stuffing identifiers (packing identifiers) are identified with 3, and 4 represents the stuffing bit (packing bit).

The pulse frame illustrated in FIG. 4, on the other hand, comprises 672 bits divided into seven blocks of 96 bits each. The positions of the additionally transmitted information, except for the bit 2 of the signalling word, remain the same within the individual blocks.

Only a slight additional outlay is required in the logic element given these two multiplex systems in order to gate all working clock signals out. The individual block lengths are generated by the first counter CO12 together with the first switchable gate G1. The counter reading of 121, for example, is gated out by the gate G1 and the counter is placed in its counter reading 0 via its setting input SE with the next clock. The first counter CO12, thus, reaches a counting period of 122. Toward the end of each block, the carry input $C_{in}$ of the block counter CO3 is activated. The block counter is therefore advanced by one count with the next working clock signal and thus characterizes the next block. The reset of the block counter CO3 ensues over the second switchable gate G3. The counter reading six is gated out and the block counter CO3 is reset into its counter reading one with the next working clock pulse T which coincides with a logical one at the carry input so that a counting period comprises six blocks. The pulse frame according to FIG. 3 is generated by so doing. Given the employed circuit technology, the working clock also only becomes effective for the reset event of the block counter when the carry input $C_{in}$ exhibits a logical one.

Given other circuit techniques, the wiring is to be correspondingly varied. The resetting of the block counter can likewise ensue in the counter reading of zero when the corresponding statuses are gated out by the second switchable gate G3.

The first switchable gate G1 can be executed with two outputs such that the block counter is already clocked one or more bits earlier. As a result thereof, it outputs change in a chronologically uncritical manner.

In order to generate the pulse frame according to FIG. 4, the first switchable gate G1 is changed over by means of input M1 such that the counter reading ninety-five is gated out. In the case of the block counter CO3, the counter reading seven is gated out by the second switchable gate G3 because the changeover input at M2 is activated and, as a result thereof, its counting period is likewise increased to seven. The required working clock signals are output at the outputs $O_1$ through $O_6$ of the logic element G4. A pulse identifying the bit 2 of the signalling word for FIG. 3 can, for example, be output at the output $O_5$ of the logic circuit G4. When, in contrast thereto, the pulse frame according to FIG. 4 is to be generated, then a working clock signal identifying the bit 2 of the signalling word can be output at the output $O_6$. It is likewise conceivable to emit working clock signals at the outputs $O_1$ through $O_6$ which are always allocated to the same bits, for example bit 2 of the signalling word may be always allocated to the output $O_5$ by means of changing over at the change-over input M3 of the logic element G4.

Given reception of a synchronizing word—this exists completely after the third bit of each pulse frame related to the lower bit rate—, the clock generator must be set anew when operations are initiated or after the loss of frame synchronism. This occurs over the control logic element G5 and the two OR elements OR1 and OR2. A synchronizing pulse at the input $I_{SY}$ applies, for example, a value four (0100 binarily) to the data inputs of the first counter CO12 and activates the setting inputs SE of the first counter CO12 and of the block counter CO3. At the next working clock signal T, thus, the first counter is switched into the counter reading four and the block counter is switched into the counter reading 1. The clock generator is thereby synchronized.

Depending upon the transit time of the components employed, it can be necessary to reset the first counter into the counter reading five or six at a later point in time due to the synchronism.

It will be apparent that many modifications and variations may be made without departing from the scope of the teachings and concepts of the present invention.

I claim as my invention:

1. A synchronous clock generator for digital signal multiplex devices comprising a first counter whose counting period corresponds to a block length of a pulse frame and which can be set into a prescribed counter reading, a block counter controlled by the first counter, and a logic element for generating working clock signals which logic element is connected to the outputs of the counters, characterized in that change-over means are provided for changing the counting period of at least one of the first counter and the block counter to adapt such counting period selectively to a plurality of respective different multiplexers; and in that the logic element gates out the working clock signals for such respective different multiplexers according to the condition of said changeover means.

2. A synchronous clock generator according to claim 1, characterized in that a switchable gate is provided as the changeover means for changing over the counting period of the first counter, the inputs of said switchable gate being connected to the outputs of the first counter and the output of said switchable gate being connected to a count setting control of the first counter.

3. A synchronous clock generator according to claim 2, with a control logic element for the first counter, the first counter having parallel data inputs controlled by the control logic element to control the setting of the first counter to a desired count value, the control logic element having an input to which a synchronizing pulse is supplied for always switching the first counter to the same count value, OR means coupled with the output of the switchable gate and with the input of the control logic element, and having an output connected to the setting control of the first counter for linking the output of the switchable gate and the input of the control logic element with said setting control of said first counter.

4. A synchronous clock generator according to claim 1, characterized in that a switchable gate is provided as the changeover means and changes over the counting period of the block counter, the inputs of said switchable gate being connected to the outputs of the block counter and OR means coupled with a synchronizing pulse and with said switchable gate and having an output connected to the setting control of the block counter.

5. A synchronous clock generator according to claim 1, with a synchronously adjustable binary counter being provided for at least one of said first counter and said block counter.

6. A synchronous clock generator according to claim 2, characterized in that the output of the switchable gate is connected to a carry input of the block counter.

7. A synchronous clock generator according to claim 1, characterized in that the logic element for generating the working clock signals is switchable according to the desired operation of the multiplexer stage.

8. A synchronous clock generator according to claim 1, characterized in that said generator is realized in integrated circuit technology.

9. A synchronous clock generator according to claim 1, characterized in that a first gate element having two outputs is provided, its first output being connected with the setting control of the first counter and its second output being connected to a carry input of the block counter.

* * * * *